(No Model.)

C. V. WOERD.
CHUCK FOR WATCH MOVEMENT PLATES.

No. 372,002. Patented Oct. 25, 1887.

WITNESSES
John F. Nelson.
Frances M. Brown.

INVENTOR
Charles V. Woerd
by his Attorneys
Brown Bros.

UNITED STATES PATENT OFFICE.

CHARLES V. WOERD, OF WALTHAM, MASSACHUSETTS.

CHUCK FOR WATCH-MOVEMENT PLATES.

SPECIFICATION forming part of Letters Patent No. 372,002, dated October 25, 1887.

Application filed November 30, 1886. Serial No. 220,264. (No model.)

*To all whom it may concern:*

Be it known that I, CHARLES V. WOERD, of Waltham, in the county of Middlesex and State of Massachusetts, have invented certain new and useful Improvements in Chucks for Chucking Watch-Movement Plates, of which the following is a full, clear, and exact description.

As well known, in the manufacture of watches the pillar and top plates require to be drilled and otherwise operated upon at certain defined points to adapt them for the reception and support or bearing of the center, third, fourth, and balance-wheels and winding-barrel, escape, and pallet of the movement. As heretofore this work has been generally accomplished in a lathe, in which the pillar and top plates are chucked, a separate chucking of the plates being necessary for each hole to be drilled.

The object of this invention is to obviate the necessity for the separate chucking of the plates for each hole; and to this end this invention consists of a holder or chuck for the pillar and top plates, in itself adapted for being centered on the rotatory arbor of the head-stock of the lathe to present the plates to the tool at the different points at which they are to be drilled, and in each instance in a line coincident with an axial line of the rotatory arbor and tool, all substantially as hereinafter described.

Figure 1:
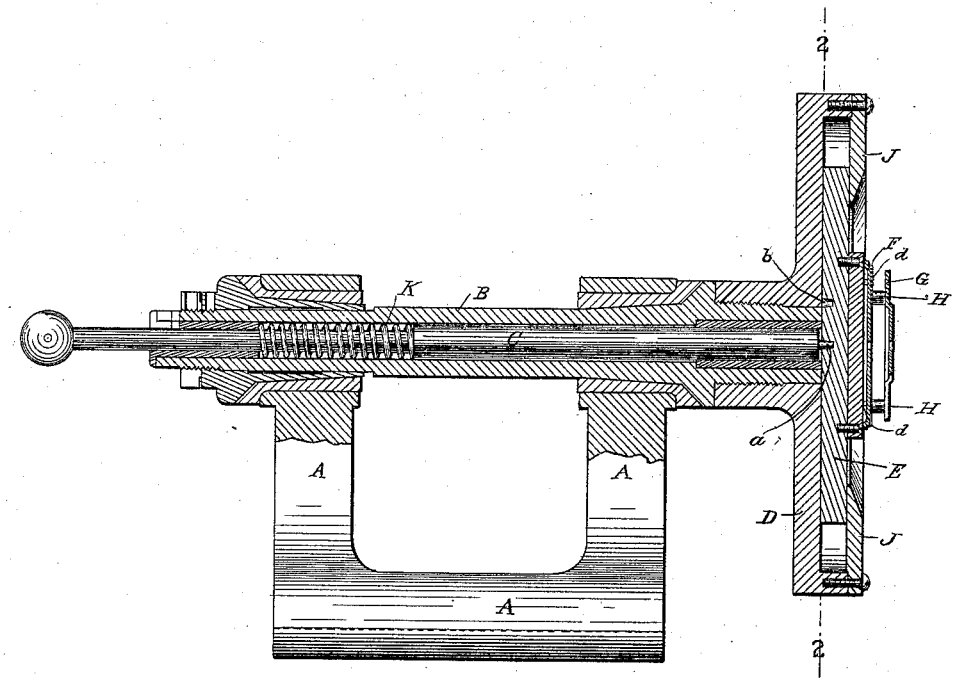
Figure 2:
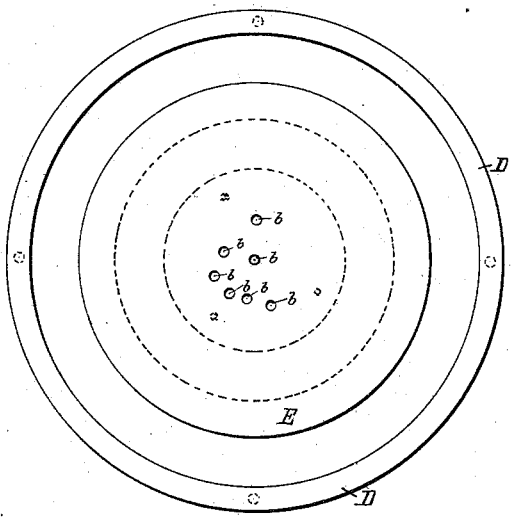
Figure 3:
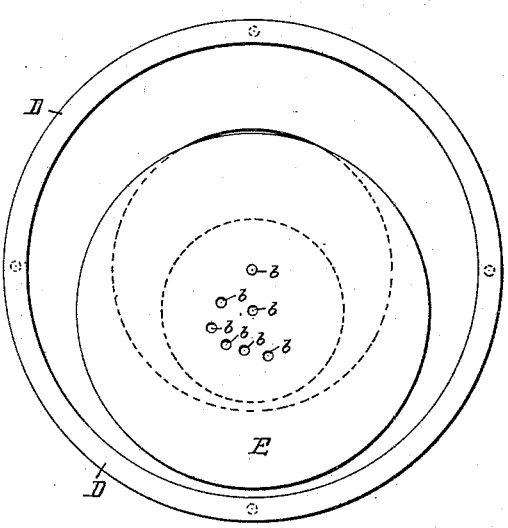

In the drawings forming part of this specification, Figure 1 is a central vertical longitudinal section of the head-stock of the lathe and of its attachments, including the chuck of this invention and the pillar and top plates of a watch-movement secured thereto. Figs. 2 and 3 are vertical sectional views on line 2 2, Fig. 1, but showing the chuck of this invention for the pillar and top plates in different positions in relation to the axis of the arbor of the head-stock of the lathe, as will hereinafter appear.

In the drawings, A is the head-stock. This head-stock is secured to a bed or shears, and it is provided with a horizontal arbor, B, turning in suitable bearings, and with what is known as a "pump-center" spindle or mandrel, C, all as well known in lathes, and especially those as used in the manufacture of watches.

The arbor B is rotated in any suitable manner, and its pump-center or mandrel C has a center-pin, $a$, which projects beyond the head-plate D of the lathe-arbor and in a line coincident with the axis of rotation of the arbor. This pin $a$ of the pump-center C receives a plate or disk, E, to which are secured the pillar and top plates, F G, of a watch to be drilled. This disk E has a series of holes, $b$, in its face by which to set it upon the pin $a$ of the pump-center C, and these holes are in positions relatively to each other and at distances apart corresponding to the holes desired to be drilled in the pillar and top plates—as, for instance, the center, third, fourth, and balance-wheel holes, the winding-barrel hole, the escape and pallet holes. The pillar and top plates, F G, secured together, as well known, by screws entered into the posts H of the pillar-plate, are set against the front and exposed face of the disk E, and placed, by the usual holes of the pillar-plate receiving the feet or pins of the watch-dial, over pins $d$, corresponding in location thereto on the disk; and when so placed the center points of the pillar and top plates will be in line with the center of the disk E, and also with the axis of the lathe-arbor when said disk E is set by the hole of its series of holes $b$, which is at its center upon the pump-center pin $a$.

The watch-plates F G are preferably secured to disk E by clamps applied at suitable points. The disk E is surrounded and overlapped by an annular flange, J, of the lathe-arbor head D, and so it is confined against the face of said head D, and so made to rotate with the head, carrying with it the pillar and top plates, F G, clamped to it, as stated.

As the pillar and top plates are rotated, as above described, the drill or other tool which is to work upon them is presented to them in a line coincident with the axial line of the lathe-arbor, and according to the hole of the series of holes $b$ of the disk E, by which said disk is placed upon the pin $a$ of the pump-center C, the watch-plate, pillar, or top, as the case may be, which is presented to the drill will be drilled.

In practice the two watch-plates, pillar, and top, are secured together, and, so secured, both clamped to the disk E; and after having drilled the top plate or otherwise worked upon it, as desired, the pillar-plate is next drilled or otherwise worked upon, as desired. In the case of both watch-plates the plate being drilled is changed in position in relation to the axial line of the pump-center for the drilling of each hole of the series of holes required, by placing the disk E, carrying the plates by its different holes *b*, upon the pin *a* of the pump-center C, said pump-center being withdrawn from the disk for the purpose, as well known.

From the above description it is obvious that the pillar and top plates, once secured to the disk E, can be drilled and otherwise prepared, as desired, without removal from said disk, thus securing absolute accuracy in the location of their several holes.

Pins may be substituted for the holes *b* in the disk E and a hole for the pin *a* of the pump-center C, but it is preferable as described.

Having thus described my invention, what I claim, and desire to secure by Letters Patent, is—

In a pump-center lathe, a rotating arbor, B, having a face-plate, D, and a pump-center, C, in combination with a disk, E, engaged by pin and hole with said pump-center C, and an annular flange, J, of said face-plate D, overlapping and confining said disk E to said face-plate, substantially as described, for the purpose specified.

In testimony whereof I have hereunto set my hand in the presence of two subscribing witnesses.

CHAS. V. WOERD.

Witnesses:
R. M. STARK,
THOS. B. EATON.